(12) United States Patent
Ware et al.

(10) Patent No.: US 6,454,471 B1
(45) Date of Patent: Sep. 24, 2002

(54) OPTICAL FIBER SPLICE SLEEVE AND METHOD FOR APPLYING SAME

(75) Inventors: Alfred F. Ware, Nikomis, FL (US); Scot K. Ware, Brentwood, TN (US)

(73) Assignee: Amherst Holding Co., Wilmington, DE (US)

( * ) Notice: Subject to any disclaimer, the term of this patent is extended or adjusted under 35 U.S.C. 154(b) by 0 days.

(21) Appl. No.: 09/451,922

(22) Filed: Dec. 1, 1999

(51) Int. Cl.[7] .............................. G02B 6/255; G02B 6/44
(52) U.S. Cl. ......................................................... 385/99
(58) Field of Search .......................... 385/99, 147, 137; 428/35

(56) References Cited

U.S. PATENT DOCUMENTS

| | | | |
|---|---|---|---|
| 3,766,079 A | * 10/1973 | Jackman et al. ................ 29/10 |
| 4,101,353 A | 7/1978 | Watson |
| 4,129,932 A | 12/1978 | Stancati |
| 4,142,508 A | * 3/1979 | Watson ........................ 126/263 |
| 4,195,106 A | * 3/1980 | Brusselmans ................. 428/35 |
| 4,237,609 A | 12/1980 | Clabburn et al. |
| 4,254,865 A | 3/1981 | Pacey et al. |
| 4,410,009 A | 10/1983 | Blum |
| 4,509,820 A | * 4/1985 | Murata et al. ................. 385/90 |
| 4,690,496 A | 9/1987 | Bortolin et al. |
| 4,714,316 A | 12/1987 | Moore et al. |
| 4,729,625 A | 3/1988 | Loscoe et al. |
| 4,799,479 A | * 1/1989 | Spears .................... 128/303.01 |
| 4,818,055 A | 4/1989 | Patterson |
| 5,009,474 A | 4/1991 | Wurmser et al. |
| 5,016,952 A | 5/1991 | Arroyo et al. |
| 5,081,695 A | 1/1992 | Gould |
| 5,138,681 A | 8/1992 | Larson et al. |
| 5,164,129 A | * 11/1992 | Douglas .................. 264/342 R |
| 5,367,594 A | 11/1994 | Essert et al. |
| 5,416,873 A | 5/1995 | Huebscher et al. |
| 5,538,020 A | * 7/1996 | Farrier et al. ................ 131/369 |
| 5,805,758 A | * 9/1998 | Kim ............................. 385/137 |
| 5,908,873 A | 6/1999 | Shustack |

OTHER PUBLICATIONS

Advertisement: "ULTRAsleeve Fusion Splice Protection Cover," Advanced Custom Applications, Inc., date unknown (but prior to filing date of application).

* cited by examiner

Primary Examiner—John D. Lee
Assistant Examiner—Michelle R. Connelly-Cushwa
(74) Attorney, Agent, or Firm—Banner & Witcoff, Ltd.

(57) ABSTRACT

A splice sleeve to protect fused or jointed optical fibers at and adjacent their point of fusion against environmental damage and to restore adequate strength by creating a suitable reinforcement at the splice after the fusion. The splice sleeve preferably includes an inner tube, a strengthening rod, an outer tube, and an activatable heat source including one or more substances. Preferably, the strengthening rod and the heat source are disposed between inner tube and outer tube. In use, the splice sleeve is positioned over the point of fusion of the fibers. The substances are exposed to each other, preferably inside of the heat shrinkable tube. This produces a chemical reaction that gives off heat sufficient to affix the splice sleeve to the fused fibers and reinforce the fibers at their point of fusion. In one arrangement, one substance is a chemical selected from the group of Be, Li, Na, Mg, K, Ca, Rb, Sr, Cs, Ba, Fr, and Ra and another substance is an aqueous solution contained in a bladder inside of said heat shrinkable tube.

27 Claims, 2 Drawing Sheets

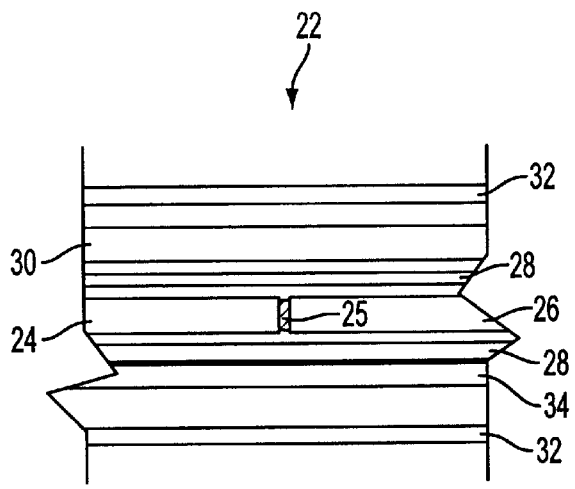
FIG. 3
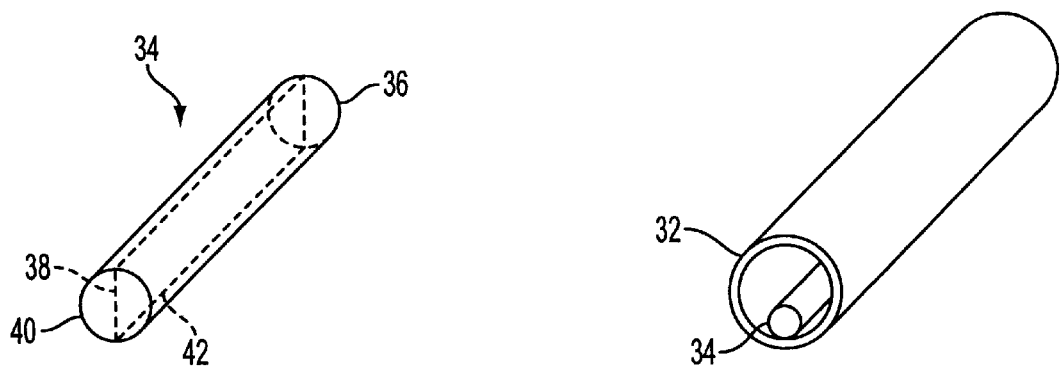
FIG. 4
FIG. 5
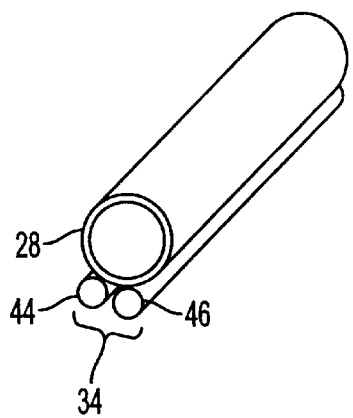
FIG. 6

OPTICAL FIBER SPLICE SLEEVE AND METHOD FOR APPLYING SAME

FIELD OF THE INVENTION

The present invention relates to an optical fiber splice sleeve and a method for applying the splice sleeve to jointed optical fibers. More specifically, the present invention relates to an optical fiber splice sleeve with a self-contained heat generating unit used for attaching the splice sleeve to the jointed optical fibers.

BACKGROUND OF THE INVENTION

Optical fiber lengths are connected or jointed together for many purposes including establishing long distance links. This type of connection is called a splice. For maximum performance, the splice should have the best possible alignment between the fiber cores, and retain that alignment. Splices can generally be categorized as mechanical splices or fusion splices, based on their principle of operation. Fusion splicing is an efficient technique for permanently jointing two fibers, and is known for its ability to achieve the tight tolerances. However, very low signal loss and high mechanical strength are very difficult to achieve simultaneously in a fusion splice. Accordingly, it is necessary to protect to protect fusion spliced fibers against environmental damage and to restore adequate strength by applying a suitable reinforcement at the splice after the fusion. Several methods have been used for splice reinforcement, however, these prior splice reinforcements, and prior techniques for applying splice reinforcements have certain disadvantages associated therewith.

In a fusion splice, the two fiber ends to be jointed are prepared by removing the primary coating and are cleaved. The fiber ends are placed into engagement with one another with accurate alignment and suitable pressure, and are heated to the fusion point to weld the fibers. The splice is then reinforced by a selected method.

One conventional reinforcement method is based on the use of a splice sleeve of the kind depicted in FIG. 1. This splice sleeve 2 consists of an inner thermosetting tube 4, a steel rod 6, and an outer shrinkable tube 8. The steel rod 6 increases the strength of the splice. Before jointing, one of the two fibers, e.g., fiber 10, is inserted into the inner thermosetting tube 4. Fibers 10 and 12 are then fused, as described above, and the splice sleeve 2 is moved back over the splicing point. This section of the joined fibers are placed into a heat oven causing the inner thermosetting tube 4 to melt around the splice, and the external tube 8 to shrink around the splice pressing the steel rod 6 into the melted inner tube 4 and the jointed fibers.

However, this splice sleeve and the technique for applying this splice sleeve have some disadvantages. First, while steel rod 6 may be suitable to provide adequate strength, it may be too stiff for some applications which require that the splice sleeve have the ability for some bending. Additionally, steel rods 6 frequently have sharp edges and ends which can potentially cut or otherwise damage the jointed fibers. The steel rod 6 also inherently has a high thermal conductivity coefficient, which causes the sleeve 2 to retain heat for a significant period of time after splicing. Further, because the rod 6 is made of steel, it is also susceptible to rust and other corrosive problems.

Additionally, as many splices are performed in a field environment, the ovens used to apply heat to the sleeves are almost exclusively powered from a portable generator. This can be a problem because the heat ovens require a significant quantity of electricity to apply the splice sleeve in excess of the quantity of electricity required to affect the splice. Accordingly, applications of these splice sleeves 2 increase the possibility of wearing the portable generator down.

Therefore, an optical fiber splice sleeve was thus needed which would eliminate or reduce the deleterious effects of sharp ends and edges, and the heat retention, rigidity, and corrosive properties associated with metal rods used in prior art splice sleeves. Additionally, an optical fiber splice sleeve was thus needed which would eliminate the requirement to provide electricity to prior splice sleeves. The present invention was developed to accomplish these and other objectives.

SUMMARY OF THE INVENTION

In view of the foregoing, it is a principal object of the present invention to provide an improved optical fiber splice sleeve.

It is also an object of the invention to provide an improved optical fiber splice sleeve which eliminates the disadvantages associated with steel reinforcing rods.

Additionally, it is another object of the invention to provide an improved optical fiber splice sleeve which eliminates the necessity to supply an oven with electricity to prolong generator life and reduce the possibility of the generator running out of electricity.

These and other objects are achieved by the present invention which, according to one aspect, provides a splice sleeve for reinforcing fused first and second optical fibers at a splice. The splice sleeve includes a heat shrinkable tube, and first and second substances located within the heat shrinkable tube. The exposure of the first and second substances to each other causes a chemical reaction that produces heat.

In yet another aspect, the invention provides a splice sleeve for reinforcing fused first and second optical fibers at a splice. The splice sleeve includes a heat shrinkable tube, and a sealed chamber containing an aqueous solution located inside the tube.

In another aspect, the invention provides a splice sleeve for reinforcing fused first and second optical fibers at a splice. The splice sleeve includes an inner heat meltable tube, an outer heat shrinkable tube, and an elongated strengthening rod disposed between the inner tube and the outer tube. A chemically-activatable heat source is coupled to at least one of the tubes and is capable of generating sufficient heat, when activated, to melt the inner tube and shrink the outer tube.

The invention also provides a splice sleeve for reinforcing fused first and second optical fibers at a splice. The splice sleeve includes a heat shrinkable tube, and a chemical selected from the group of Be, Li, Na, Mg, K, Ca, Rb, Sr, Cs, Ba, Fr, and Ra, and mixtures thereof, contained inside of said heat shrinkable tube.

In yet another aspect, the invention provides a method for reinforcing fused first and second optical fibers at a point of fusion. The method includes providing a splice sleeve having a heat shrinkable tube, and positioning the splice sleeve over the point of fusion. The first and second substances are exposed to each other inside of the heat shrinkable tube. The exposure of the first and second substances to each other produces a chemical reaction giving off heat sufficient to affix the splice sleeve to the fused first and second fibers.

These and other objects and features of the invention will be apparent upon consideration of the following detailed

BRIEF DESCRIPTION OF THE DRAWINGS

FIG. 3 is a longitudinal cross-sectional view of the fiber optic splice sleeve taken along a portion of line 3—3 of FIG. 2;

FIG. 4 is a perspective view of a divided bladder containing different substances in its separated compartments that chemically react and give off heat when exposed to one another;

FIG. 5 is a perspective view of a substance containing bladder attached to the inside of the outer tube; and FIG. 6 is a perspective view of separated bladders, each containing different substances, attached to the outside of the inside tube.

DETAILED DESCRIPTION OF THE PREFERRED EMBODIMENT

Figure 1:
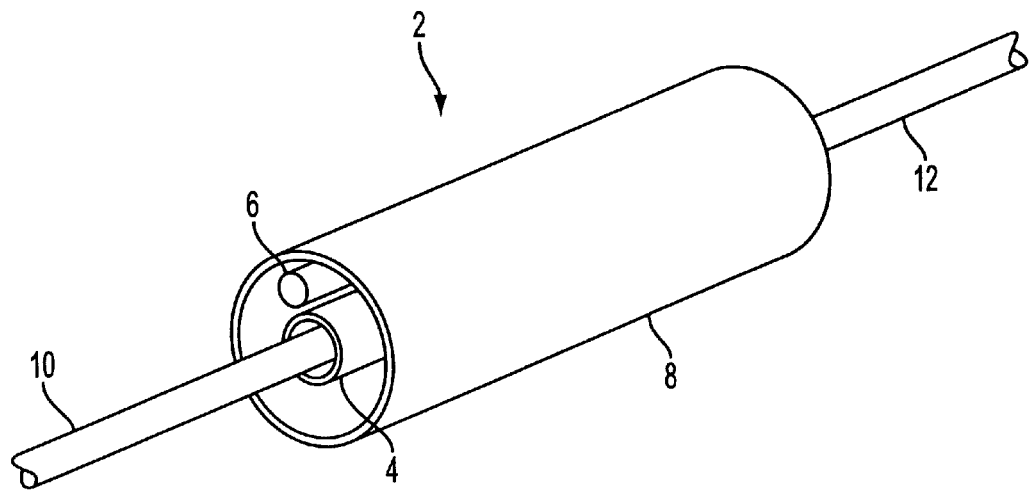
FIG. 1 is a schematic perspective view of a prior art fiber optic splice sleeve.

In the present invention, as pictured in FIGS. 2–6, an optical fiber splice sleeve, is designated generally by reference numeral 22. Splice sleeve 22 is used to protect fused or jointed optical fibers 24 and 26, at and adjacent their point of fusion 25, against environmental damage and to restore adequate strength by creating a suitable reinforcement at the splice after the fusion.

Figure 2:
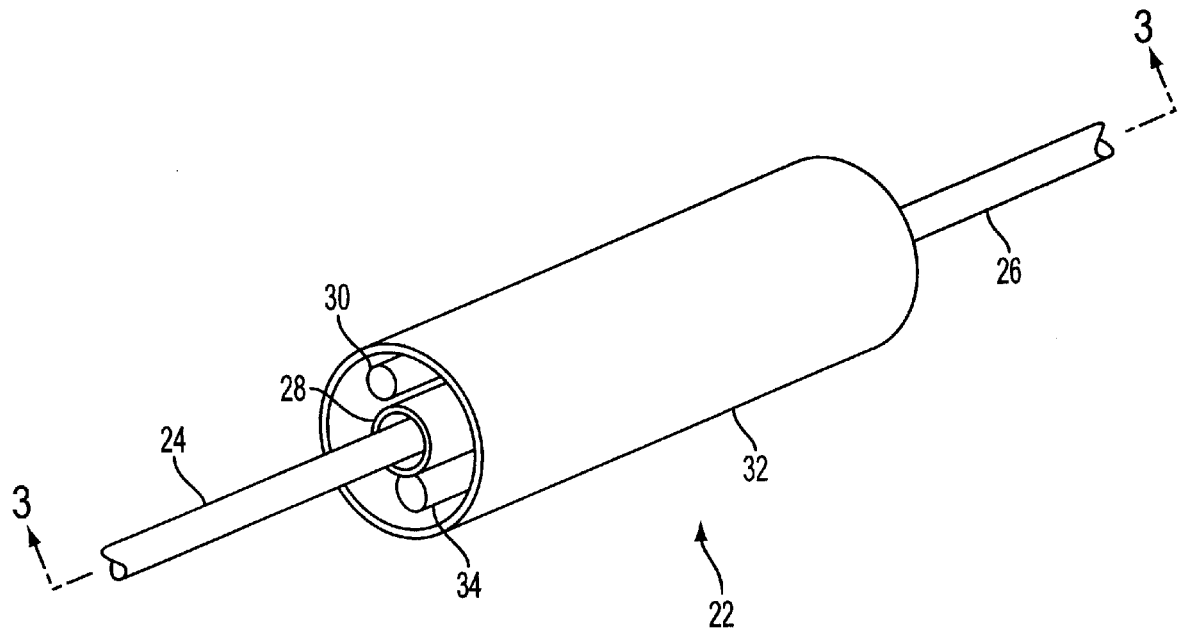
FIG. 2 is a schematic perspective view of a fiber optic splice sleeve according to the present invention.

As shown in FIG. 2, splice sleeve 22 includes an inner tube 28, a strengthening rod 30, an outer tube 32. Inside of outer tube 32, splice sleeve 22 includes an activatable heat source which can be one or both of first and second substances. The first and second substances chemically react when exposed to each other and heat is produced as a by-product of the reaction. That is, an exothermic reaction inside of the outer tube 32 occurs. The heat given off is sufficient to melt the inner tube 28 and shrink the outer tube 32 around the spliced fibers 24 and 26.

Inner tube 28 is preferably meltable adhesive tubing, i.e., a hot melt adhesive hollow tube, that surrounds the fused fibers 24 and 26 when properly positioned. Inner tube 28 facilitates the attachment of reinforcing rod 30 to the spliced fibers 24 and 26, and will melt upon exposure to a predetermined temperature for a predetermined period of time to help accomplish such a result. One preferred material for the inner tube is a hot-melt glue. However, it is recognized that other materials can be used.

Outer tube 32 is preferably a heat shrinkable tube and is disposed around the inner tube 28 and the spliced fibers 24 and 26. Upon the application of sufficient heat for a predetermined period of time, outer tube 28 shrinks to press reinforcing rod 30 into the outside of inner tube 28 and toward the spliced fibers 24 and 26. Upon cooling, outer tube 32 helps retain reinforcing rod 30 against the spliced fibers 24 and 26 at their point of fusion 25. One preferred material for the outer tube is polyethylene. However, it is recognized that other materials can be used.

Reinforcing rod 30 provides the axial stability for splice sleeve 22 and for the fused fibers 24 and 26. Reinforcing rod 30 is preferably nonmetallic, and more specifically, made of a synthetic material or polymer which provides sufficient strength to reinforce the fibers 24 and 26 at their point of fusion 25. a preferred embodiment, reinforcing rod 3 is made from an aromatic polyamide fiber of extremely high tensile strength and greater resistance of elongation than steel. One material fitting these preferences is KEVLAR™. However, it is recognized that the reinforcing rod 28 may be made from other materials. A nonmetallic reinforcing rod 30 is preferable as it can be made to have no sharp ends and as it provides mechanical strength to prevent excess bending of the splice while leaving some bend radius sometimes needed in special storage applications. Additionally, in comparison to steel reinforcing rods, reinforcing rod 30 of the present invention reduces heat retention after splicing and splice sleeve setting, and eliminates potential corrosion problems.

As previously described, a chemically-activatable heat source is included, preferably inside of the outer heat-shrinkable tube 32, and generates heat when activated. One activatable heat source 34 used to create the exothermic reaction preferably includes two different substances chemicals contained in separated compartments or regions inside of the outer tube 32 that give off heat when mixed. Alternatively, one substance can be initially located inside of the outer tube 32, and the second substance may be introduced into sleeve 22 to cause the heat producing reaction to occur.

In one embodiment, as shown in FIGS. 2 and 4, the first and second substances can be located in a single bladder 34, vessel, or container that has an outer wall 36 and separated compartments 40 and 42 with each compartment containing one of the two substances. The compartments 40 and 42 can be separated by a dividing wall 38 that divides the inside region of the bladder 34 into the two separate chemical containing regions of compartments 40 and 42.

The bladder 34 is preferably attached to one or both of the tubes 28 and 32, and is preferably disposed between inner tube 28 and outer tube 32. In a preferred embodiment, the activatable heat source bladder 34 is grafted or otherwise attached to inner tube 28 as shown in FIGS. 2 and 3. However, bladder 34 may be attached to the inside of outer tube 32 as shown in FIG. 5. In another arrangement, not shown, the bladder 34 can be attached or coupled to the outside of outside tube 32.

Alternatively, as shown in FIG. 6, the first and second substances may be in separated compartments that can include a plurality of chemical containing bladders 44 and 46. Each bladder 44 and 46 may be attached to the inner tube 28 or the outer tube 32. It is recognized that alternative arrangements of chemical containing compartments could be used.

Application of mechanical pressure to the outside of splice sleeve 22 causes the dividing wall 38 or bladders 44 and 46 to rupture which exposes the substances to each other and produces the exothermic reaction. If a dividing wall 38 is used, it is preferably easily rupturable along its body or a seam. If desired, a crimping tool, not shown, can be used to rupture the dividing wall 38 or the bladders 44 and 46.

Any combination of substances producing an exothermic reaction may be used which generates sufficient heat to shrink the outer tube 32, and melt the inner tube 28, if one is used. In a preferred arrangement, the heat given off is sufficient to bring the temperature of the splice sleeve 22 to 280° F. for approximately 95 seconds. One combination of substances utilizes magnesium which reacts with water. The chemical reaction that generates the heat is:

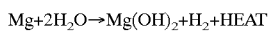

$Mg + 2H_2O \rightarrow Mg(OH)_2 + H_2 + HEAT$

An aqueous salt water solution can be used to start the reaction. Iron can be used with the magnesium to scavenge the chlorine.

While magnesium is described in the above example as a preferred reactive substance, other substances in lieu of magnesium may be used including but not limited chemicals in columns I and II of the periodic table. Such chemicals may include Be, Li, Na, Mg, K, Ca, Rb, Sr, Cs, Ba, Fr, and Ra.

Exposing the chemicals to one another can be accomplished by a technician, through the use of a hand crimping tool mechanically breaking the bladder and starting the chemical reaction that produces the heat. In the alternative, one of the chemicals may be contained in the splice sleeve 22 and the other chemical can be injected or otherwise introduced into the splice sleeve 22 to expose the reacting substances with one another. Preferably, an outer casing, not shown, may-be used around the splice sleeve 22 to conserve the heat given off to maximize the heat exposure to melt and shrink the tubes 28 and 32. If desired, the casing may be part of the hand crimping tool to minimize operator requirements.

If one or both of the substances are contained in one or more bladders, it is preferred that the bladders are made from a glue-based or meltable plastic material that will melt in response to the heat given off by the exothermic chemical reaction.

In an alternative embodiment, not shown, the activatable heat source can be a single bladder containing a first substance. A second substance which produces an exothermic reaction when mixed with the first substance, is introduced into the bladder. This can be accomplished by puncturing a bladder wall and injecting the second substance or by any other suitable technique. In another embodiment, not shown, a first substance is deposited inside of the outer tube 32, the outside of the inner tube 28, or in another suitable location inside of the outer tube 32. A second substance which produces an exothermic reaction when mixed with the first substance, is introduced inside of the splice sleeve 22 and into contact with the first substance to create the desired chemical reaction. For example, the magnesium may be deposited as one or more solid pieces or in flakes on the inside of the outer tube 32 and the salt water may be injected inside the splice sleeve 22 to expose the substances and create the desired chemical reaction.

In operation, one fiber, for example fiber 24, is inserted through inner tube 28 of splice sleeve 22. Splice sleeve 22 is moved along the fiber 24 to provide sufficient clearance to prepare the ends of the fibers 24 and 26 for splicing. The inner tube 28 helps to guide the sleeve 22 as it is moved along the fiber 24. Any desired procedure for cable preparation and splicing is utilized. The fibers 24 and 26 are jointed at their point of fusion 25. Splice sleeve 22 is then guided along the fiber 24 and over the point of fusion 25. The reacting substances are exposed to each other by a designated technique. For example, if one or more bladders is used, a crimping tool, not shown, may be used to apply external pressure splice sleeve 22 and rupture a bladder or a dividing wall therein. The exposure of the substances to each other creates a reaction that gives off sufficient heat to soften and/or melt inner tube 28, and to shrink outer tube 32. If the crimping tool is provided with a casing, the crimping tool is preferably locked into its position for a period of time sufficient to accomplish the desired melting and shrinking of the tubes 28 and 32. The fused fibers are now sufficiently reinforced and may be put into an organizer tray, a splice case, or used in any desired manner.

It is noted that while the strengthening rod 30 is used in a preferred embodiment, it is not a required element in the splice sleeve 22 as the combination of the adhesives and the shrunken outer tube 32 may provide adequate reinforcement for desired applications. Additionally, while the inner meltable tube 28 is used in a preferred embodiment for its guiding capabilities, it too is not a required element as the sleeve 22 will be guided by the remainder of the elements. Further, meltable adhesives can be used for any provided bladders that will assist in the setting of the sleeve and the reinforcement of the fused fibers.

Additionally, while this splice sleeve 22 is shown for reinforcing a single spliced fiber, it is recognized that splice sleeves containing heat activatable sources can be provided for reinforcing mass fusion splices, where more than one fiber is spliced.

While particular embodiments of the invention have been shown and described, it is recognized that various modifications thereof will occur to those skilled in the art. Therefore, the scope of the herein-described invention shall be limited solely by the claims appended hereto.

What is claimed is:

1. A splice sleeve for reinforcing fused first and second optical fibers at a splice, the splice sleeve comprising:
   a heat shrinkable tube;
   a first substance located within the heat shrinkable tube; and
   a second substance located within the heat shrinkable tube and separated from the first substance, wherein the exposure of the first and second substances to each other causes a chemical reaction that produces heat.

2. The splice sleeve of claim 1, further comprising a sealed chamber located within the heat shrinkable tube, said sealed chamber containing said first substance.

3. The splice sleeve of claim 2, wherein the sealed chamber includes first and second compartments separated by a rupturable dividing wall, said first compartment containing said first substance and said second compartment containing said second substance.

4. The splice sleeve of claim 2, wherein the second substance is spaced from and distinct from the sealed chamber.

5. The splice sleeve of claim 2, wherein the second substance includes a chemical selected from the group of Be, Li, Na, Mg, K, Ca, Rb, Sr, Cs, Ba, Fr, and Ra.

6. The splice sleeve of claim 2, further comprising an inner heat meltable tube disposed inside the heat shrinkable tube.

7. The splice sleeve of claim 6, wherein said sealed chamber is attached to said inner heat meltable tube.

8. The splice sleeve of claim 6, wherein said sealed chamber is attached to said heat shrinkable tube.

9. The splice sleeve of claim 1, further comprising a nonmetallic strengthening rod located inside said heat shrinkable tube.

10. A splice sleeve for reinforcing fused first and second optical fibers at a splice, the splice sleeve comprising:
    a heat shrinkable tube; and
    a sealed chamber located inside the tube, said sealed chamber containing an aqueous solution.

11. The splice sleeve of claim 10, further comprising a substance located within said heat shrinkable tube, said substance chemically reacting with said aqueous solution and generating heat sufficient to shrink the heat shrinkable tube around the fused fibers when exposed thereto.

12. The splice sleeve of claim 11, further comprising an inner heat meltable tube disposed inside the heat shrinkable tube, said generated heat sufficient to melt the heat meltable tube.

13. The splice sleeve of claim 12, wherein said substance includes a chemical selected from the group of Be, Li, Na, Mg, K, Ca, Rb, Sr, Cs, Ba, Fr, and Ra, and mixtures thereof.

14. The splice sleeve of claim 12, wherein said sealed chamber is attached to said inner heat meltable tube.

15. The splice sleeve of claim 11, wherein the sealed chamber includes a rupturable dividing wall dividing the aqueous solution and the substance.

16. The splice sleeve of claim 10, wherein said sealed chamber is attached to said heat shrinkable tube.

17. The splice sleeve of claim 10, further comprising a strengthening rod located inside said heat shrinkable tube and being disposed parallel to the fused fibers.

18. The splice sleeve of claim 17, wherein said strengthening rod is nonmetallic.

19. The splice sleeve of claim 18, wherein said strengthening rod is comprised of an aromatic polyamide fiber.

20. A splice sleeve for reinforcing fused first and second optical fibers at a splice, the splice sleeve comprising:
    an inner heat meltable tube;
    an outer heat shrinkable tube;
    an elongated strengthening rod disposed between the inner tube and the outer tube; and
    a chemically-activatable heat source coupled to at least one of said tubes, said chemically-activatable heat source capable of generating sufficient heat, when activated, to melt the inner tube and shrink the outer tube.

21. A splice sleeve for reinforcing fused first and second optical fibers at a splice, the splice sleeve comprising:
    a heat shrinkable tube; and
    a chemical selected from the group of Be, Li, Na, Mg, K, Ca, Rb, Sr, Cs, Ba, Fr, and Ra, and mixtures thereof, contained inside of said heat shrinkable tube.

22. The splice sleeve of claim 21, further comprising an aqueous solution located within said heat shrinkable tube, said chemical reacting with said aqueous solution and generating heat sufficient to shrink the heat shrinkable tube around the fused fibers when exposed thereto.

23. The splice sleeve of claim 22, further comprising an inner heat meltable tube disposed inside the heat shrinkable tube, said generated heat sufficient to melt the heat meltable tube.

24. The splice sleeve of claim 23, further comprising a nonmetallic strengthening rod located inside said heat shrinkable tube and being disposed parallel to the fused fibers.

25. The splice sleeve of claim 24, wherein said strengthening rod is comprised of an aromatic polyamide fiber.

26. A splice sleeve for reinforcing fused first and second optical fibers at a splice, the splice sleeve comprising:
    a heat shrinkable tube;
    a first substance located within the heat shrinkable tube; and
    a second substance located within the heat shrinkable tube and separated from the first substance, wherein the first and second substances are selected such that the exposure of the first and second substances to each other causes a chemical reaction that produces sufficient heat to shrink said heat shrinkable tube.

27. A splice sleeve for reinforcing fused first and second optical fibers at a splice, the splice sleeve comprising:
    a heat shrinkable tube; and
    heat-generating means comprising a chemical selected from the group of Be, Li, Na, Mg, K, Ca, Rb, Sr, Cs, Ba, Fr, and Ra, and mixtures thereof, for generating sufficient heat to shrink said heat shrinkable tube.

* * * * *